United States Patent [19]

Minchak

[11] 3,853,830

[45] Dec. 10, 1974

[54] PROCESS FOR PREPARING POLYMERS OF CYCLOPENTENE

[75] Inventor: Robert J. Minchak, Parma Heights, Ohio

[73] Assignee: The B. F. Goodrich Company, New York, N.Y.

[22] Filed: Mar. 2, 1973

[21] Appl. No.: 337,392

[52] U.S. Cl. ............................. 260/88.2, 260/93.1
[51] Int. Cl. .......................... C08f 7/02, C08f 15/04
[58] Field of Search ........................... 260/93.1, 88.2

[56] References Cited
UNITED STATES PATENTS

| | | | |
|---|---|---|---|
| 3,074,918 | 1/1963 | Eleuterio | 260/93.1 |
| 3,336,278 | 8/1967 | Ploetz et al. | 260/88.2 |
| 3,414,554 | 12/1968 | Kahle et al. | 260/93.7 |
| 3,449,310 | 6/1969 | Dall'Asta et al. | 260/93.1 |
| 3,492,278 | 1/1970 | Uraneck et al. | 260/93.1 |
| 3,597,403 | 8/1971 | Ofstead | 260/88.2 |
| 3,684,781 | 8/1972 | Nutzel et al. | 260/80.78 |

OTHER PUBLICATIONS

G. Natta & G. Dall'Asta in "Polymer Chemistry of Synthetic Elastomers," 1969, Interscience, pp. 703–726.

Natta et al., Angew. Chemie International Edition, 1964, 3, pp. 723–729.

Calderon et al., J. of Polymer Science, A–1, 1967, 5, pp. 2209–2217.

Natta & Dall'Asta, Makromolekulare Chemie, 1966, 91, pp. 87–106.

*Primary Examiner*—Joseph L. Schofer
*Assistant Examiner*—A. L. Clingman
*Attorney, Agent, or Firm*—J. Hughes Powell, Jr.

[57] ABSTRACT

Cyclopentene homopolymers and copolymers are prepared in a process comprising polymerizing cyclopentene monomers alone or with one or more cyclic comonomer olefins with a catalyst comprising an organoaluminum compound, iodine and a tungsten salt or molybdenum salt or mixture thereof.

9 Claims, No Drawings

PROCESS FOR PREPARING POLYMERS OF CYCLOPENTENE

BACKGROUND OF THE INVENTION

Cycloolefins can be polymerized through the olefin structure to yield poly-cycloaliphatics, or through a ring-opening process to yield unsaturated linear polymers. The latter process has particular appeal, since the polymers so made are sulfur-vulcanizable. Since cyclopentene is a readily available ethylene production by-product, much of the art focuses on the ring-opening polymerization of cyclopentene.

The prior art teaches that the ring opening polymerization of cyclopentene can be catalyzed by a mixture comprising a tungsten salt or molybdenum salt or mixture thereof and an organometallic compound of a Group III metal. Molecular oxygen or a compound having an oxygen-oxygen or oxygen-hydrogen bond may be used as an activator.

SUMMARY OF THE INVENTION

The invention provides a process for the preparation of cyclopentene homopolymers and copolymers, comprising polymerizing cyclopentene monomer alone or with one or more co-monomers with a catalyst comprising an organoaluminum compound, iodine and a tungsten salt or molybdenum salt or mixture thereof. This improved process provides enhanced yield of polymer. A lower level of tungsten salt or molybdenum salt or mixture thereof is required than when the organoaluminum compound is used without free iodine. The process allows titration for the removal of impurities.

DETAILED DESCRIPTION

The cyclopentene is homopolymerized to a linear, unsaturated polypentenamer. The cyclopentene may be copolymerized with one or more cyclic co-monomer olefins co-monomers. The catalyst system comprises an organo-aluminum compound, iodine and a salt of molybdenum, tungsten or a mixture thereof. The level of tungsten salt or molybdenum salt or mixture thereof may be reduced by about 80 to 90 percent or more from the level used with an organoaluminum compound alone. There is no deleterious effect on polymer yield or properties, and there is a cost savings for the expensive salt.

The organoaluminum compounds have the formula $AlR_3$ or $AlR_xX_y$ wherein R is an alkyl radical containing 1 to 12 carbon atoms or an aryl radical containing 6 to 14 carbon atoms; X is fluorine, chlorine or bromine; and x is 1 or 2, y is 1 or 2, and $x + y = 3$. Examples of suitable compounds include diethylaluminum chloride, diethylaluminum fluoride, ethylaluminum difluoride and diphenyl aluminum chloride; trialkyl compounds such as trimethyl aluminum, triethyl aluminum, tri-$n$-propyl aluminum, triisopropyl aluminum, triisobutyl aluminum, trihexyl aluminum, triheptyl aluminum, trioctyl aluminum, triisooctyl aluminum, tridecyl aluminum and the like; triaryl aluminum compounds such as triphenyl aluminum, tribenzyl aluminum, tritolyl aluminum, and the like. More preferred among the organoaluminum compounds are the lower alkyl aluminum chlorides and fluorides and alkyl aluminum compounds wherein the alkyl group contains 2 to 6 carbon atoms such as diethylaluminum fluoride, ethylaluminum difluoride, diethyl aluminum chloride, triethyl aluminum and the like. Excellent results were obtained with triethyl aluminum.

Examples of tungsten and molybdenum salts used include halides such as chlorides, bromides, iodides and fluorides, which include compounds such as tungsten hexachloride, molybdenum pentachloride, molybdenum hexachloride, tungsten hexabromide, molybdenum pentabromide, molybdenum hexabromide, tungsten hexaiodide, molybdenum pentaiodide, molybdenum hexaiodide, tungsten hexafluoride, molybdenum pentafluoride, and molybdenum hexafluoride; tungsten halogen oxides and molybdenum halogen oxides such as tungsten dioxydichloride, molybdenum dioxydichloride, tungsten oxytetrabromide, molybdenum dioxydibromide, tungsten oxytetraiodide, molybdenum oxytetrafluoride and tungsten oxytetrafluoride; and tungsten alkoxides and molybdenum alkoxides such as tungsten pentachloride ethoxide. Other representative salts are those of acetylacetonates, sulfates, phosphates, nitrates and the like which include compounds such as tungsten acetylacetonate, molybdenum acetylacetonate, tungsten sulfate, molybdenum sulfate, tungsten phosphate, molybdenum phosphate, tungsten nitrate, and molybdenum nitrate. Mixtures of these salts may also be employed. More preferred among the salts are the tungsten halides and molybdenum halides, especially tungsten hexahalides, molybdenum pentahalides and molybdenum hexahalides. Excellent results are obtained using tungsten hexachloride.

The tungsten salt or molybdenum salt or mixture thereof is employed at a level from about 0.01 to about 10 millimoles per mole of monomer and more preferably from about 0.02 to about 5 millimoles per mole of monomer. The organoaluminum compound is used in a molar ratio of organo-aluminum compound to metal salt(s) of from about 0.2 to about 20 moles per mole and higher. The elemental iodine is used in the range of from about 0.1 mole to about 10 moles of iodine per mole of organoaluminum compound.

A polymerization activator may be used. Examples of activator include water, methanol, ethanol, isopropyl alcohol, benzyl alcohol, phenol, ethyl mercaptan, 2-chloro-ethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. Excellent activation is obtained by using air or a peroxide or hydroperoxide as the activator, especially by using the organic peroxides such as benzoyl peroxide.

The activator may be employed in a range from about 0 moles to about 10 moles per mole of organoaluminum compound. The activator may be added at any point in the charge procedure, but it is more preferably added last, after the tungsten salt.

A molecular weight modifier may be used. Examples of such modifiers are typically acyclic olefins such as 1-butene, 3-methyl-1-butene, and the like. From about 0.1 percent up to equal parts by weight based upon the weight of the monomer charged may be employed. To obtain ultra-high molecular weight it is desirable to have no modifier present. The molecular weight modifier may be added at any point in the charge procedure, but it is more preferably added along with the cyclopentene monomer.

The polymerization may be performed as a batch or continuous process and in bulk or in solution. Examples of solvents include pentane, hexane, heptane, cyclopentane, cyclohexane, benzene, chlorobenzene, toluene, xylene and mixtures thereof. Benzene was found to be an excellent solvent. The solvent may be added at any point in the charge procedure, but it is more preferably charged first.

The process is effectively used to prepare cis- and trans-polypentenamer homopolymers. Up to 90 percent by weight of a copolymerizable monomer may be used, based upon the total weight of monomer charged. More preferably, the copolymerizable monomers are used in a range from about 0.5 to about 30 percent by weight, based upon the total weight of monomer charged. Such copolymerizable monomers include other monocyclic monoolefins such as cyclobutene, cycloheptene, cyclooctene, cyclodecene, cyclopentadiene, 1,5-cyclooctadiene, norbornene, norbornadiene, dicyclopentadiene, indene and the like.

The monomer(s) may be added at any point in the charging procedure. Normally, the monomer(s), solvent, if used, and modifier are added first to the reactor vessel. These ingredients may be added separately or as a mixture of ingredients. The organoaluminum compound and iodine normally are added next, usually as a solution in a solvent such as benzene and the like. The tungsten salt or molybdenum salt or mixture thereof is added, usually as a solution in a solvent such as benzene and the like, followed by the activator if used. It is preferred that the tungsten salt be added after the organoaluminum compound and iodine and at polymerization temperatures. The reaction mixture in the reactor vessel may be cooled or heated to polymerization temperature at the start of the additions or any point before the addition of the tungsten salt or molybdenum salt or mixture thereof.

Monomeric impurities such as water and the like should be removed prior to addition of the tungsten salt, molybdenum salt or mixture thereof. The mixture of organo-aluminum compound and iodine may be used to titrate the monomer(s) or mixture of monomer(s) and solvent until a color change from pink to colorless is noted. A catalytic amount of organoaluminum compound and iodine may then be added, followed by addition of the tungsten salt or molybdenum salt or mixture thereof.

Polymerization temperature is from about −80°C. to about 100°C. The polymerization may be short-stopped by addition of alcohols, amines or carboxylic acids such as ethanol, t-butyl phenol, diethylamine, acetic acid and the like.

The polymers may be isolated by any method known to the art such as by direct drying under reduced pressure, by precipitation using an alcohol such as methanol, ethanol, isopropanol and the like, or by steam or hot water stripping. The polymer is recovered and may be further washed with water or alcohol and then dried.

The polypentanamers are high molecular weight products having a dilute solution viscosity (DSV) from about 0.5 to about 20 as measured at a concentration of 0.1 gram in 100 milliliters of toluene at 25°C. The polymers have a variable cis-trans content which is dependent upon the polymerization temperature used for a given catalyst system. The cis-content is determined by using infra-red spectrum techniques developed for measuring cis- and transcontent in polybutadiene rubber.

The high cis-content polypentanamers are vulcanized readily to elastomers having excellent low temperature properties. The high trans-content polypentanamers are vulcanized readily to elastomers having outstanding physicomechanical properties and high green strength comparable to that of natural rubber. Elemental sulfur or a thiuram di- or polysulfide may be used along with a broad range of accelerators and other compounding ingredients.

These polypentenamers are useful in cements or adhesives, gaskets, seals, protective coatings, linings, tires and the like.

The following Examples serve to illustrate the invention more fully.

EXAMPLES 1 – 7

Cyclopentene was polymerized to form polypentenamer polymers by the following procedure. Glass or glass-lined reactor vessels were used. The vessel was well-cleaned prior to the run with soap and water, followed by an acetone rinse and flushed with nitrogen until dry. The cyclopentene was mixed with benzene and added to the reactor vessel. The iodine, triethyl aluminum, tungsten hexachloride and benzoyl peroxide were added consecutively as 0.106, 0.5, 0.05 and 0.1 molar solutions in benzene, respectively. Polymerization was initiated upon the addition of the tungsten salt. The polymerizations produced little heat, and little agitation was required for efficient polymerization. The reactions were short-stopped by the addition of ethanol, and the polymers were precipitated using ethanol, washed with ethanol and recovered. About 1 part by weight of di-t-butyl paracresol was added to the polymer as an anti-oxidant, and the polymer was dried in a vacuum oven at 50°C. Percent yield was based upon the weight of cyclopentene monomer charged. Dilute solution viscosity was measured on a solution of 0.1 gram of polymer in 100 milliliters of toluene at 25°C. Percent trans-content was determined using infra-red procedures with polybutadiene polymers as standards. The grams and moles of reactants and yield, dilute solution viscosity (DSV) and trans content of the polymer are set forth in Table I.

TABLE I

| Example | 1 | 2 | 3 | 4 | 5 | 6 | 7 |
|---|---|---|---|---|---|---|---|
| Benzene: | | | | | | | |
| Grams | 30.2 | 31.7 | 30.9 | 30.2 | 31.0 | 31.0 | 33.0 |
| Moles | 0.39 | 0.41 | 0.40 | 0.39 | 0.40 | 0.40 | 0.42 |
| Cyclopentene: | | | | | | | |
| Grams | 9.5 | 9.5 | 9.5 | 9.6 | 9.0 | 9.5 | 9.6 |
| Moles | 0.14 | 0.14 | 0.14 | 0.14 | 0.13 | 0.14 | 0.14 |
| Iodine: | | | | | | | |
| Grams | 0 | 0.013 | 0 | 0.013 | 0.013 | 0.025 | 0.051 |
| Millimoles | 0 | 0.05 | 0 | 0.05 | 0.05 | 0.10 | 0.20 |
| Triethyl aluminum: | | | | | | | |
| Grams | 0.006 | 0.006 | 0.006 | 0.006 | 0.006 | 0.006 | 0.006 |
| Millimoles | 0.05 | 0.05 | 0.05 | 0.05 | 0.05 | 0.05 | 0.05 |
| Tungsten hexachloride: | | | | | | | |
| Grams | 0.010 | 0.010 | 0.002 | 0.002 | 0.004 | 0.004 | 0.004 |
| Millimoles | 0.025 | 0.025 | 0.005 | 0.005 | 0.01 | 0.01 | 0.01 |
| Benzoyl peroxide: | | | | | | | |
| Grams | 0 | 0 | 0.003 | 0.003 | 0.003 | 0.003 | 0.003 |
| Millimoles | 0 | 0 | 0.02 | 0.02 | 0.02 | 0.02 | 0.02 |
| Al/W molar ratio | 2.0 | 2.0 | 10. | 10. | 5.0 | 5.0 | 5.0 |
| Activator/Al molar ratio | 0 | 0 | 0.4 | 0.4 | 0.4 | 0.4 | 0.4 |
| Temperature, °C | 22 | 22 | 22 | 22 | 22 | 22 | 22 |
| Time, hours | 2 | 2 | 2 | 2 | 0.25 | 2 | 2 |
| Polymer, grams | 1.7 | 4.0 | 0 | 1.3 | 1.7 | 5.6 | 2.3 |
| Percent yield | 18 | 42 | 0 | 14 | 19 | 59 | 24 |
| DSV | 3.54 | 4.57 | | 6.48 | 5.95 | 6.48 | 7.25 |
| Percent trans structure | 79 | 77 | | 77 | 78 | 81 | 81 |

I claim:

1. A process for polymerizing cyclopentene with a catalyst comprising (A) at least one organoaluminum compound of the formula $AlR_3$ wherein R is an alkyl radical containing 1 to 12 carbon atoms, (B) iodine, and (C) at least one tungsten or molybdenum salt or mixture thereof wherein the amount of said salt is from about 0.01 to about 10 millimoles per mole of cyclopentene monomer, the molar ratio of B/A is from about 0.1/1 to about 10/1, and the molar ratio of A/C is from about 0.2/1 to about 20/1.

2. A process of claim 1 wherein R is an alkyl radical containing 2 to 6 carbon atoms.

3. A process of claim 1 wherein (C) is a halide.

4. A process of claim 2 wherein (C) is a halide.

5. A process of claim 4 wherein (C) is tungsten hexachloride.

6. A process of claim 5 wherein R is triethyl aluminum.

7. A process of claim 1 wherein the monomer is dissolved in a solvent.

8. A process of claim 7 wherein the solvent is benzene.

9. A process of claim 1 wherein at least one other cyclic olefin is included.

* * * * *